(12) United States Patent
Park et al.

(10) Patent No.: US 11,789,576 B2
(45) Date of Patent: Oct. 17, 2023

(54) FLEXIBLE TOUCH PANEL AND METHOD OF MANUFACTURING THEREOF

(71) Applicant: Electronics and Telecommunications Research Institute, Daejeon (KR)

(72) Inventors: Chan Woo Park, Daejeon (KR); Sang Hoon Cheon, Daejeon (KR); Tae-Youb Kim, Daejeon (KR); Bock Soon Na, Daejeon (KR); Ji-Young Oh, Daejeon (KR); Su Jae Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/903,145

(22) Filed: Sep. 6, 2022

(65) Prior Publication Data

US 2023/0152930 A1     May 18, 2023

(30) Foreign Application Priority Data

Nov. 16, 2021   (KR) ........................ 10-2021-0157980
Apr. 6, 2022   (KR) ........................ 10-2022-0042819

(51) Int. Cl.
    *G06F 3/044*      (2006.01)

(52) U.S. Cl.
     CPC .. *G06F 3/0446* (2019.05); *G06F 2203/04102* (2013.01); *G06F 2203/04103* (2013.01);
(Continued)

(58) Field of Classification Search
     CPC ......... G06F 3/0446; G06F 2203/04102; G06F 2203/04103; G06F 2203/04111; G06F 2203/04112
(Continued)

(56) References Cited

U.S. PATENT DOCUMENTS 9,323,328 B2    4/2016   Kim et al.
9,817,529 B2   11/2017   Bae et al.
(Continued)

FOREIGN PATENT DOCUMENTS

KR    10-2016-0086484 A    7/2016
KR    10-2020-0079856 A    7/2020

OTHER PUBLICATIONS

Wang, Tingting, et al. "Recent developments in flexible transparent electrode." *crystals* vol. 11. Issue 5 (2021): 511. pp. 1-22.
(Continued)

*Primary Examiner* — Mark Edwards
(74) *Attorney, Agent, or Firm* — NSIP Law

(57) ABSTRACT

Provided is a flexible touch panel. The flexible touch panel includes a first sensor part extending in a first direction on a substrate, a second sensor part extending in a second direction crossing the first direction on the substrate, and a protective layer surrounding the first and second sensor parts, wherein the first sensor part includes first sensor patterns spaced apart from each other in the first direction, a first connection electrode disposed between the first sensor patterns adjacent to each other, and first connection patterns connecting the first connection electrode and the first sensor patterns to each other, wherein each of the first sensor patterns includes first electrode patterns spaced apart from each other in a form of a mesh and first wiring patterns connecting the adjacent first electrode patterns to each other, wherein each of the first wiring patterns and the first connection patterns has a serpentine structure, wherein the first electrode patterns and the first wiring patterns include the same material as each other.

21 Claims, 19 Drawing Sheets

(52) U.S. Cl.
CPC .............. *G06F 2203/04111* (2013.01); *G06F 2203/04112* (2013.01)

(58) Field of Classification Search
USPC .......................................................... 345/12
See application file for complete search history.

(56) References Cited

U.S. PATENT DOCUMENTS

| | | | |
|---|---|---|---|
| 10,649,496 | B2 | 5/2020 | Choi et al. |
| 10,741,777 | B2 | 8/2020 | Hwang et al. |
| 2016/0202827 | A1* | 7/2016 | Bae ....................... G06F 3/0443 345/174 |
| 2016/0259447 | A1 | 9/2016 | Lin et al. |
| 2017/0147114 | A1* | 5/2017 | Dong .................... G06F 3/0443 |
| 2018/0323240 | A1* | 11/2018 | Won ...................... G06F 3/0446 |
| 2019/0384428 | A1* | 12/2019 | Ahn ...................... G06F 3/0446 |
| 2020/0092990 | A1* | 3/2020 | Hu ......................... H05K 3/207 |
| 2020/0333661 | A1* | 10/2020 | Song ................. G02F 1/133528 |
| 2020/0379586 | A1* | 12/2020 | Wang ................... G06F 3/04164 |
| 2021/0382584 | A1* | 12/2021 | Xin ....................... G06F 3/0445 |
| 2022/0317806 | A1* | 10/2022 | Fan ...................... G06F 3/0443 |

OTHER PUBLICATIONS

Senthil Kumar, Kirthika, et al. "A review of printable flexible and stretchable tactile sensors." *Research* 2019 (2019). pp. 1-32.

Gao, Dace, et al. "Inkjet-Printed Iontronics for Transparent, Elastic, and Strain-Insensitive Touch Sensing Matrix." *Advanced Intelligent Systems* vol. 2. Issue 7 (2020): 2000088. pp. 1-10.

* cited by examiner

FIG. 1
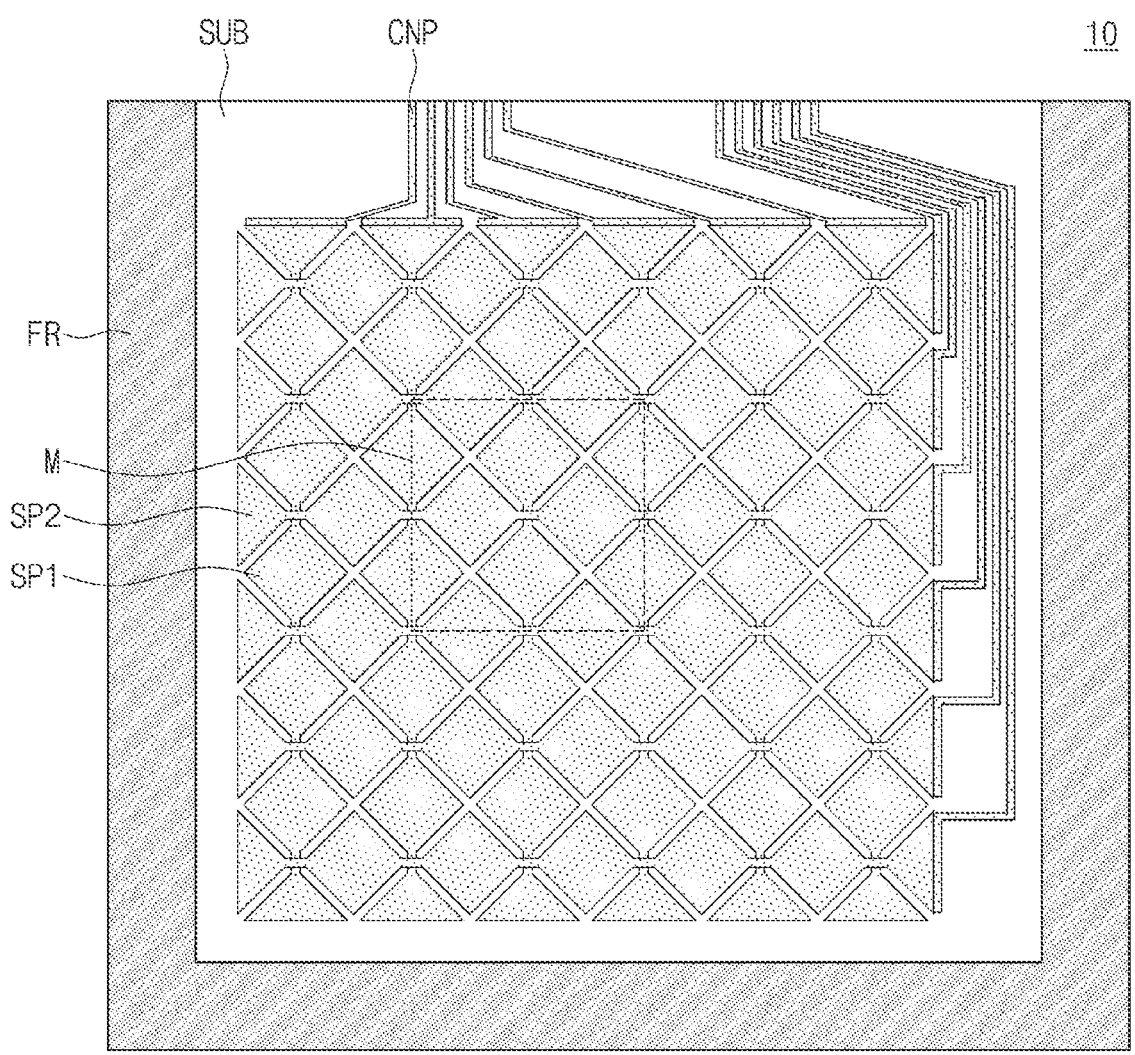
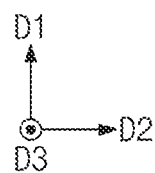

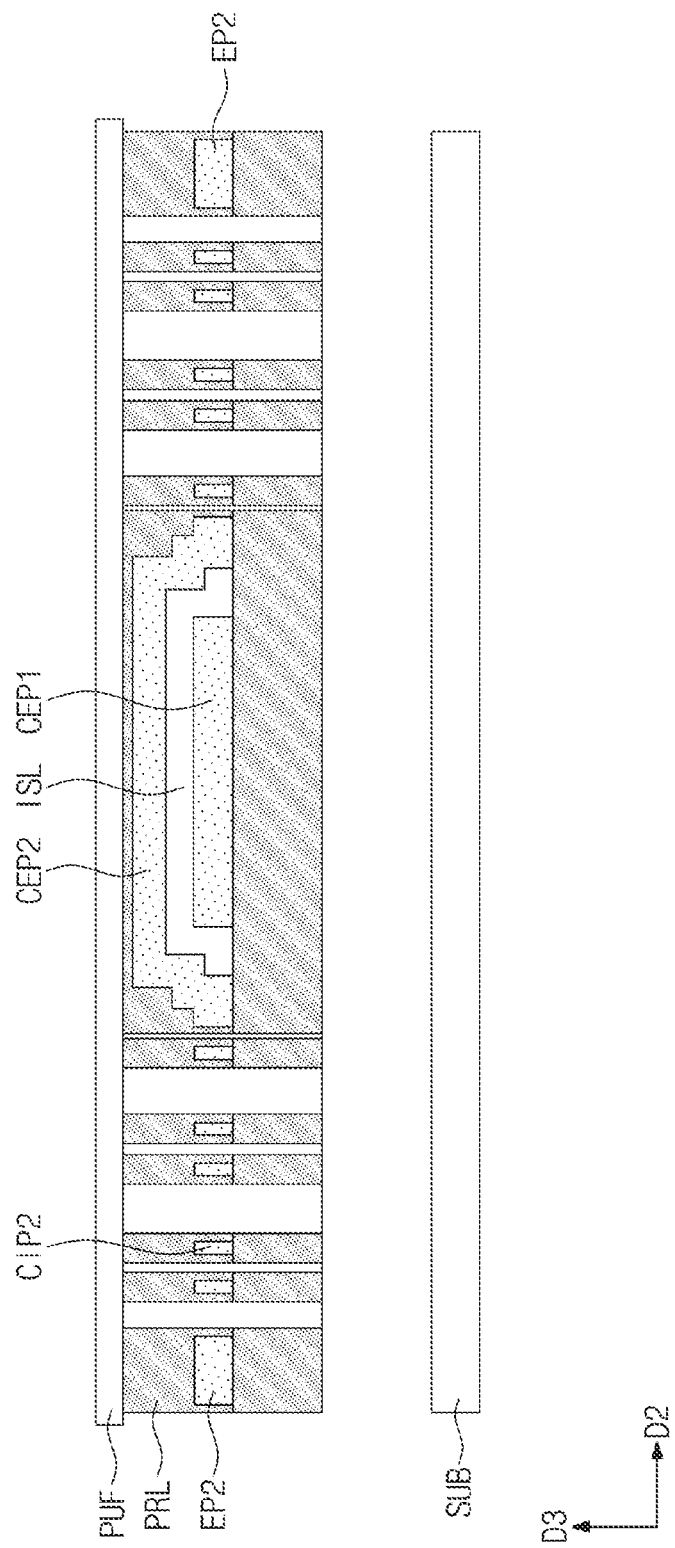

FLEXIBLE TOUCH PANEL AND METHOD OF MANUFACTURING THEREOF

CROSS-REFERENCE TO RELATED APPLICATIONS

This U.S. non-provisional patent application claims priority under 35 U.S.C. § 119 of Korean Patent Application Nos. 10-2021-0157980, filed on Nov. 16, 2021, and 10-2022-0042819, filed on Apr. 6, 2022, the entire contents of which are hereby incorporated by reference.

BACKGROUND

The present disclosure relates to a flexible touch panel and a manufacturing method thereof, and more particularly, to a mutual capacitance type flexible touch panel and a manufacturing method thereof.

Flexible circuits and sensors that may maintain functions even when folded or stretched in any direction by external force may be used in various fields such as displays, robots, wearable devices, and bio devices. In particular, a flexible display that may stretch the panel in any direction and may adhere to a curved surface beyond the stage of rollable or folding is in the spotlight as a next-generation technology. A flexible display requires not only an image output function, but also a user interface (UI) that receives an input signal from the user and reflects the intention. Touch recognition is the most representative UI among them. When flexibility is implemented with improved touch panel technology, a touch recognition function may be mounted on various types of electronic devices. However, the touch panel uses a transparent conductive oxide as an electrode material, but since the material itself has a hard property, it is difficult to apply it to a flexible display.

SUMMARY

The present disclosure provides a flexible touch panel with improved flexibility and touch recognition capability.

The present disclosure also provides a method of manufacturing a flexible touch panel that may implement fine patterns.

An embodiment of the inventive concept provides a flexible touch panel including a first sensor part extending in a first direction on a substrate, a second sensor part extending in a second direction crossing the first direction on the substrate, and a protective layer surrounding the first and second sensor parts, wherein the first sensor part includes first sensor patterns spaced apart from each other in the first direction, a first connection electrode disposed between the first sensor patterns adjacent to each other, and first connection patterns connecting the first connection electrode and the first sensor patterns to each other, wherein each of the first sensor patterns includes first electrode patterns spaced apart from each other in a form of a mesh and first wiring patterns connecting the adjacent first electrode patterns to each other, wherein each of the first wiring patterns and the first connection patterns has a serpentine structure, wherein the first electrode patterns and the first wiring patterns include the same material as each other.

In an embodiment of the inventive concept, a method for manufacturing a flexible touch panel includes: forming a first preliminary protective layer on a carrier substrate; forming a first connection electrode on the first preliminary protective layer; forming an insulating layer covering a portion of the first connection electrode; forming a preliminary electrode film on an entire surface of the first preliminary protective layer; etching the preliminary electrode film to form a first sensor part extending in a first direction and a second sensor part extending in a second direction crossing the first direction; forming a second preliminary protective layer covering the first and second sensor parts; forming a protective layer by etching the first preliminary protective layer and the second preliminary protective layer in shapes corresponding to the first sensor part and the second sensor part; and transferring the first sensor part and the second sensor part to a substrate.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIG. 1 is a plan view of a flexible touch panel according to embodiments of the inventive concept;

FIGS. 15 and 16 are cross-sectional views for explaining a method of manufacturing a flexible touch panel according to embodiments of the inventive concept.

DETAILED DESCRIPTION

Figure 2:
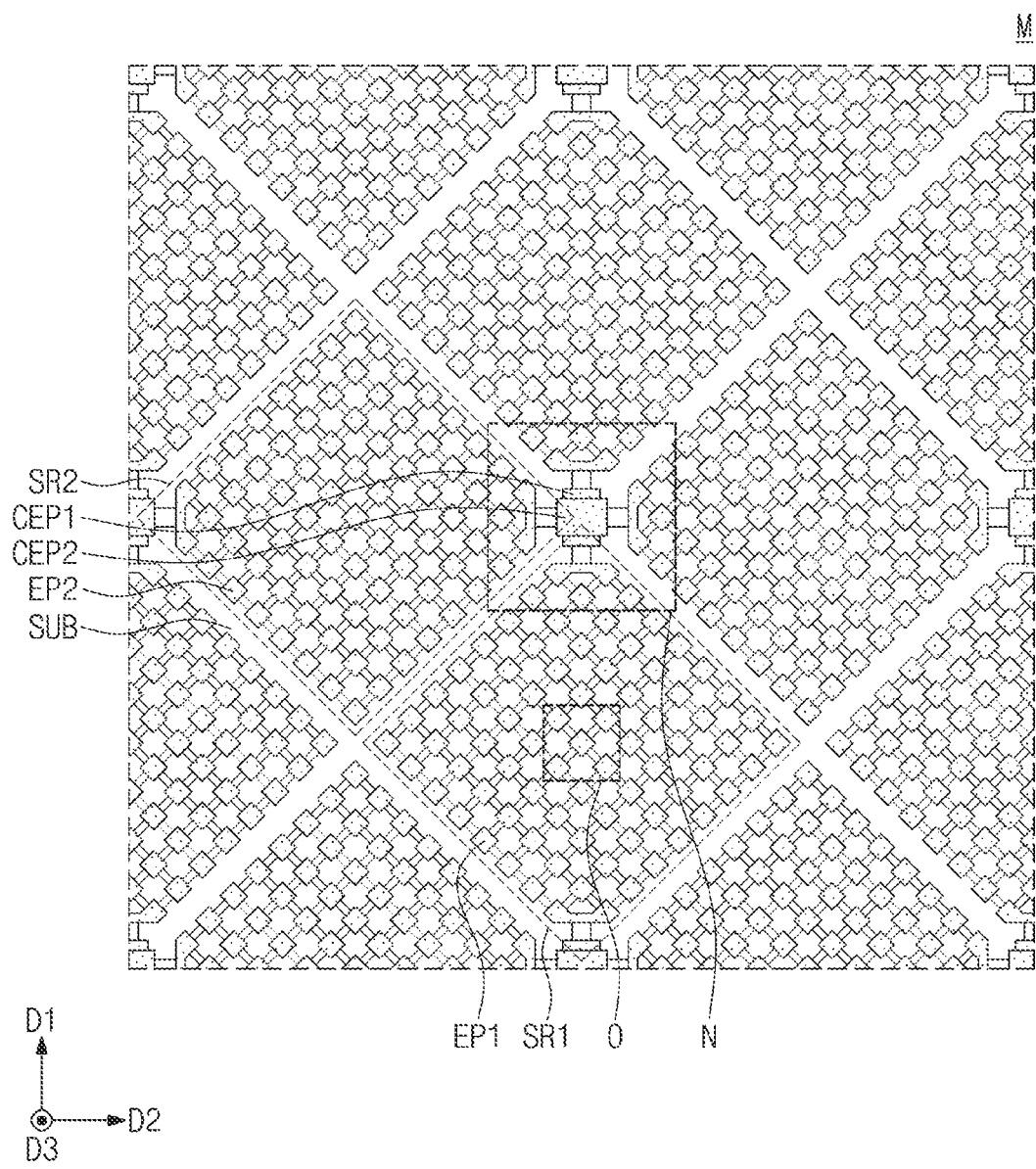
FIG. 2 is a plan view illustrating an enlarged area M of FIG. 1.

Advantages and features of the inventive concept, and a method of achieving them, will become apparent with reference to the embodiments described below in detail in conjunction with the accompanying drawings. However, the inventive concept is not limited to the embodiments disclosed below, but may be implemented in various different forms, and only these embodiments are provided so that the disclosure of the inventive concept is complete, and to fully inform those of ordinary skill in the scope of the invention in the technical field to which the inventive concept belongs, and the invention is only defined by the scope of the claims. Like reference numerals refer to like elements throughout the specification.

The terms used in this specification are for describing embodiments and are not intended to limit the inventive concept. In this specification, the singular form also includes the plural form unless specifically stated in the phrase. As used in the specification, in relation to 'comprises' and/or 'comprising', the mentioned elements, steps, operations and/or elements do not exclude the presence or addition of one or more other elements, steps, operations and/or elements.

Further, the embodiments described herein will be described with reference to cross-sectional and/or plan views, which are ideal illustrative views of the inventive concept. In the drawings, thicknesses of films and regions are exaggerated for effective description of technical content. Accordingly, the shape of the illustrative drawing may be modified due to manufacturing technology and/or tolerance. Accordingly, the embodiments of the inventive concept are not limited to the specific form shown, but also include changes in the form generated according to the manufacturing process. Accordingly, the regions illustrated in the drawings have schematic properties, and the shapes of the regions illustrated in the drawings are intended to illustrate a specific shape of the device region and are not intended to limit the scope of the invention.

In addition, terms used in the present specification may be interpreted as meanings commonly known to those of ordinary skill in the art, unless otherwise defined.

FIG. 1 is a plan view of a flexible touch panel according to embodiments of the inventive concept.

Referring to FIG. 1, the flexible touch panel 10 may include first sensor parts SP1 and second sensor parts SP2 disposed on a substrate SUB. The substrate SUB may include a flexible material. For example, the substrate SUB may include an elastomer such as rubber. The substrate SUB may surround side surfaces of the first sensor parts SP1 and side surfaces of the second sensor parts SP2. As another example, the substrate SUB may further surround the upper and lower surfaces of the first and second sensor parts SP1 and SP2, respectively.

Each of the first sensor parts SP1 may extend in the first direction D1. The first sensor parts SP1 may be arranged parallel to each other in the second direction D2. The second direction D2 may intersect the first direction D1. For example, the second direction D2 may be perpendicular to the first direction D1. Each of the second sensor parts SP2 may extend in the second direction D2. The second sensor parts SP2 may be arranged parallel to each other in the first direction D1.

Each of the first sensor parts SP1 may constitute a transmission electrode (e.g., Tx electrode) of the flexible touch panel 10. Each of the second sensor parts SP2 may constitute a reception electrode (e.g., Rx electrode) of the flexible touch panel 10. An electric field may be formed between the first sensor part SP1 and the second sensor part SP2. That is, the first sensor part SP1 and the second sensor part SP2 may be charge-coupled. When a touch is applied to the flexible touch panel 10 according to the inventive concept, the electric field generated by the transmission electrode may be absorbed by the touched object, thereby reducing the capacitance between the transmission electrode and the reception electrode. Accordingly, a signal sensed by the reception electrode is changed, and a touch may be sensed using this. That is, the flexible touch panel 10 according to embodiments of the inventive concept may use a mutual capacitance method. The mutual capacitance method is superior to the self capacitance method in terms of accuracy in catching the touch location, and has the advantage of being able to supplement the multi-touch function caused by the ghost touch.

Each of the first sensor parts SP1 and the second sensor parts SP2 may include the same transparent conductive oxide. For example, each of the first sensor parts SP1 and the second sensor parts SP2 may include indium tin oxide (ITO). As another example, each of the first sensor parts SP1 and the second sensor parts SP2 may include an opaque metal material such as molybdenum.

The first sensor parts SP1 and the second sensor parts SP2 may cross each other. In a plan view, the first sensor parts SP1 and the second sensor parts SP2 may form a mesh shape.

The first sensor parts SP1 and the second sensor parts SP2 may be connected to the external connection electrode CNP. A sensing signal measured by the first sensor part SP1 and the second sensor part SP2 may be transmitted to an external electronic device through the external connection electrode CNP. The external connection electrode CNP may include the same material as that of the first sensor part SP1 and the second sensor part SP2. As an example, the external connection electrode CNP may include ITO.

The frame FR may surround the substrate SUB. As an example, the frame FR may include a printed circuit board (PCB). The frame FR may serve to support the substrate SUB. The frame FR may surround at least one side surface of the substrate SUB. As will be described later, the frame FR may be used as a casting mold for forming the substrate SUB when the flexible touch panel 10 is manufactured.

FIG. 2 is a plan view illustrating an enlarged area M of FIG. 1.

Referring to FIG. 2, the first sensor part SP1 may include first sensor patterns SR1 spaced apart from each other in the first direction D1. For example, the first sensor pattern SR1 may have a rhombus shape in a plan view. The first sensor part SP1 may include a first connection electrode CEP1 between the first sensor patterns SR1 adjacent to each other in the first direction D1. The first connection electrode CEP1 may be connected to the first sensor patterns SR1 adjacent thereto in the first direction D1.

Each of the first sensor patterns SR1 may include first electrode patterns EP1 spaced apart from each other in a mesh shape. In a plan view, the first electrode patterns EP1 may have a rhombus shape.

The second sensor part SP2 may include second sensor patterns SR2 spaced apart from each other in the second direction D2. For example, the second sensor pattern SR2 may have a rhombus shape in a plan view. The second sensor part SP2 may include a second connection electrode CEP2 between the second sensor patterns SR2 adjacent to each other in the second direction D2. The second connection electrode CEP2 may be connected to the second sensor patterns SR2 adjacent thereto in the second direction D2. The first connection electrode CEP1 and the second connection electrode CEP2 may be provided at a point where the first sensor part SP1 and the second sensor part SP2 cross each other. The second connection electrode CEP2 may be provided on the first connection electrode CEP1. A portion of the second connection electrode CEP2 may vertically overlap the first connection electrode CEP1.

Each of the second sensor patterns SR2 may include second electrode patterns EP2 spaced apart from each other in a mesh shape. In a plan view, the second electrode patterns EP2 may have a rhombus shape. The first sensor pattern SR1 and the second sensor pattern SR2 may have substantially the same shape and structure.

Figure 3:
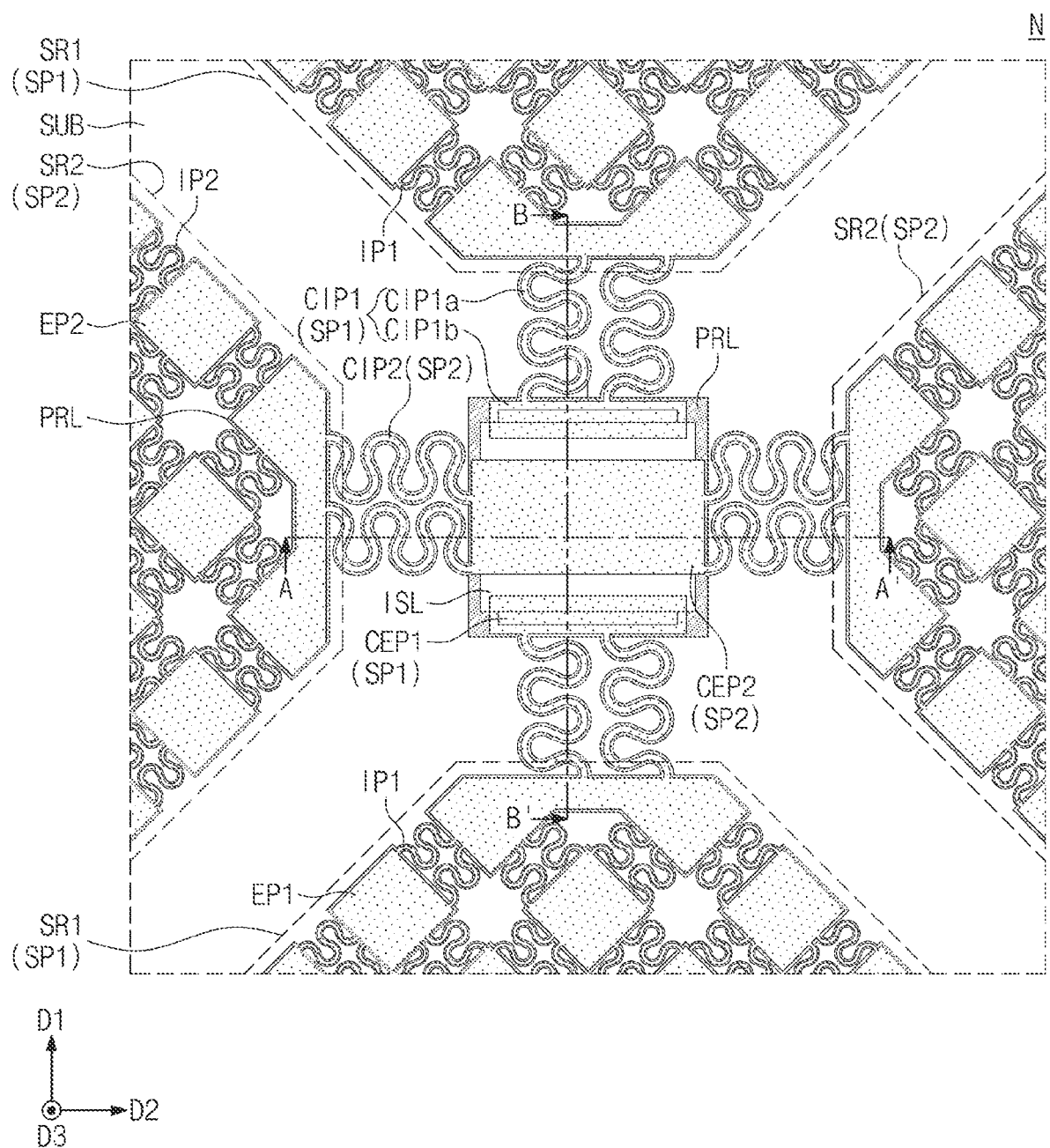
FIG. 3 is a plan view illustrating an enlarged area N of FIG. 2.
Figure 4A:
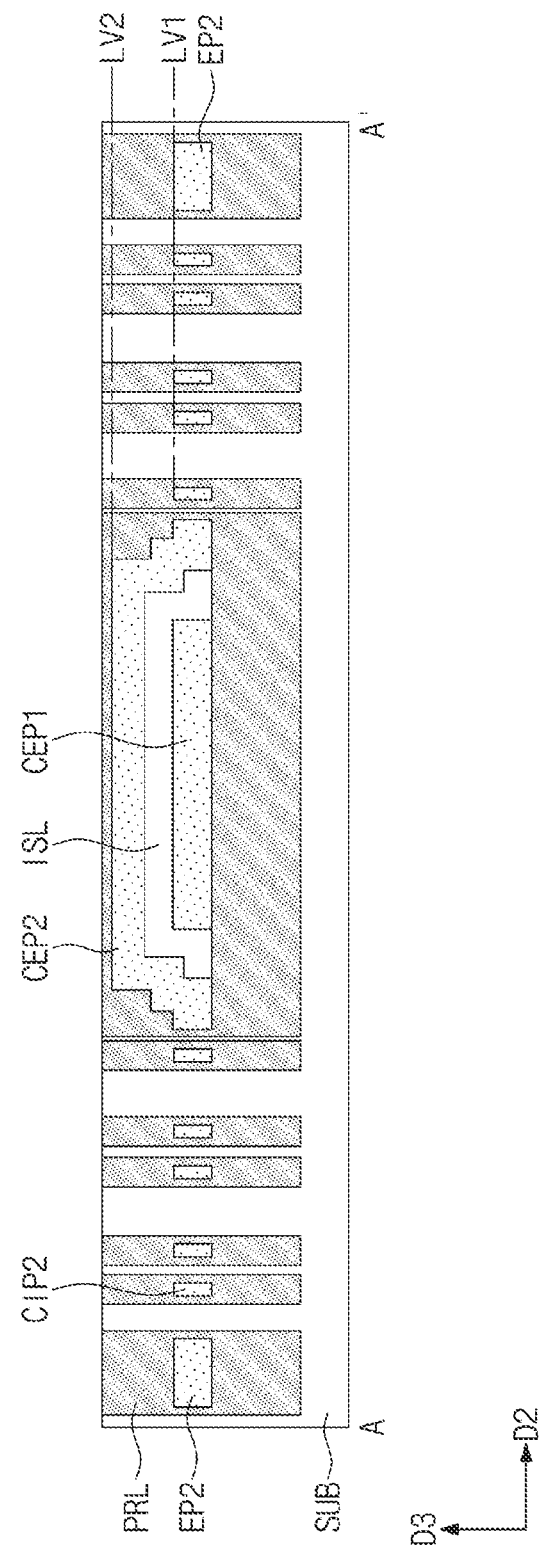
FIGS. 4A and 4B are cross-sectional views taken along lines A-A' and B-B' of FIG. 3, respectively.
Figure 4B:
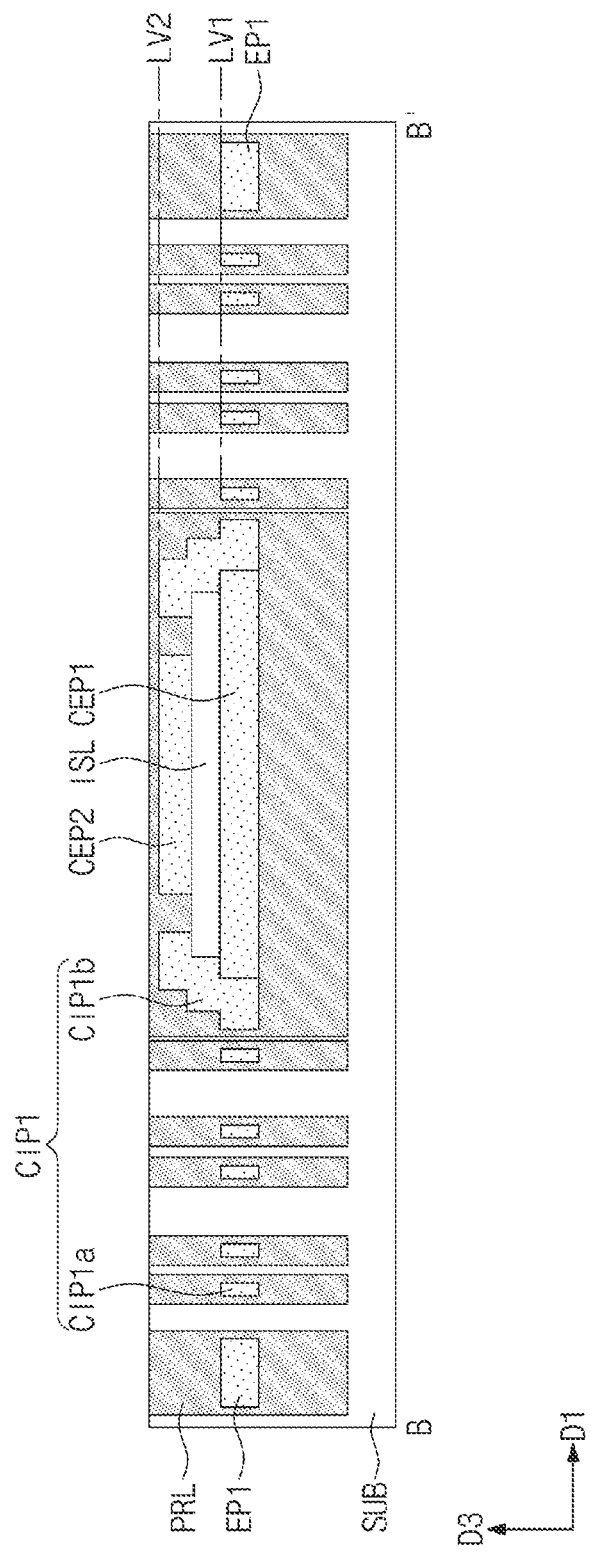
Figure 5:
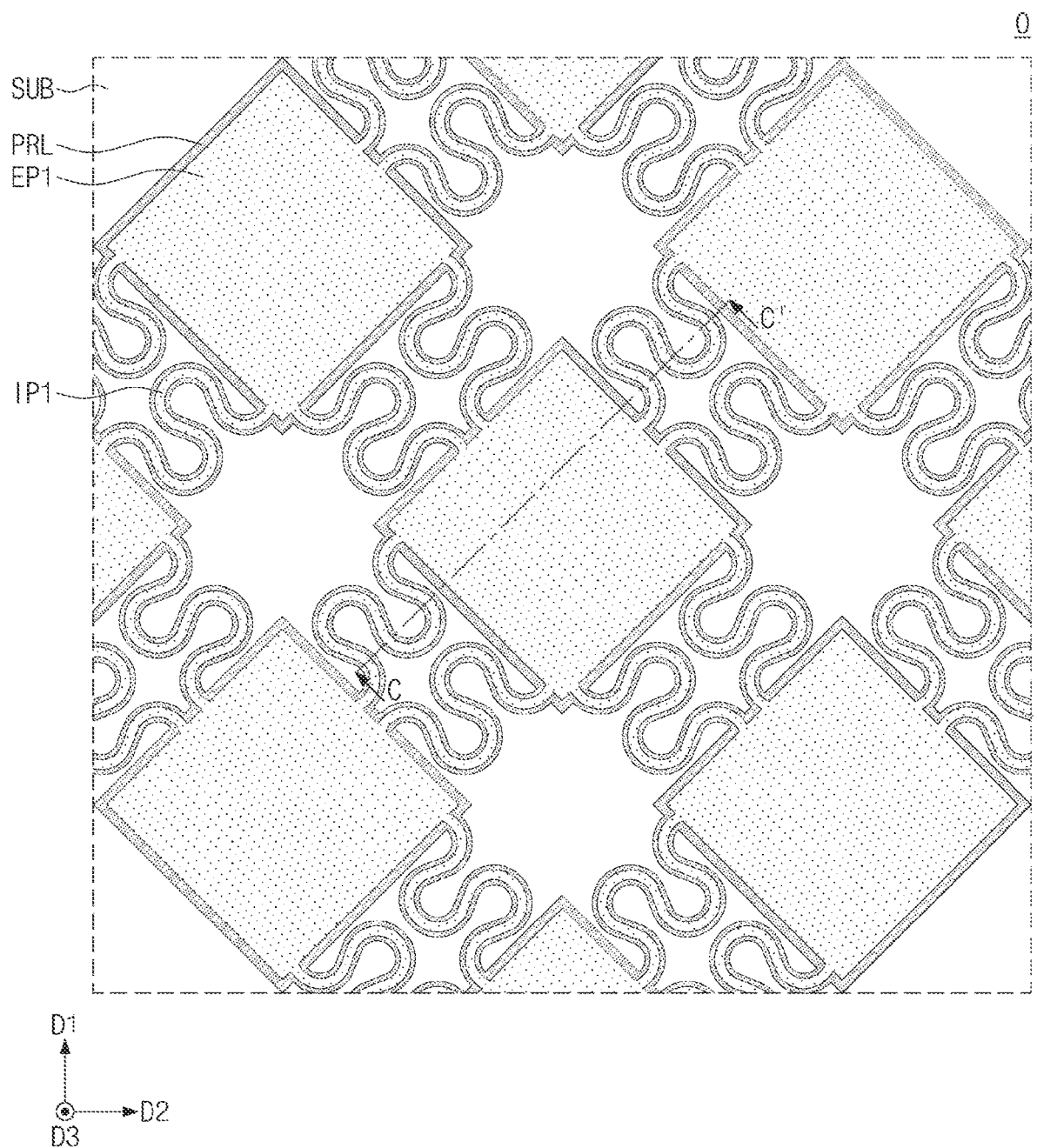
FIG. 5 is a plan view illustrating an enlarged area O of FIG. 2.
Figure 6:
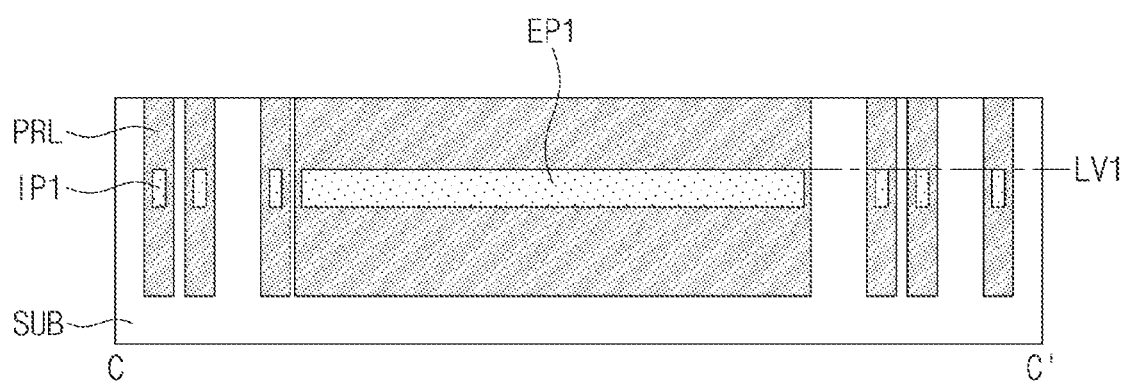
FIG. 6 is a cross-sectional view taken along line C-C' of FIG. 5.

FIG. 3 is a plan view illustrating an enlarged area N of FIG. 2. FIGS. 4A and 4B are cross-sectional views taken along lines A-A' and B-B' of FIG. 3, respectively. FIG. 5 is a plan view illustrating an enlarged area O of FIG. 2. FIG. 6 is a cross-sectional view taken along line C-C' of FIG. 5. Referring to FIGS. 3 to 6, the first sensor part SP1 and the second sensor part SP2 will be described in more detail.

Referring to FIGS. 3 to 6, the first electrode patterns EP1 of the first sensor pattern SR1 may be connected to each other through the first wiring patterns IP1. The first wiring patterns IP1 may connect the first electrode patterns EP1 adjacent to each other. The first wiring patterns IP1 may have a serpentine structure. The first connection electrode CEP1 and the first sensor pattern SR1 may be connected to each other through the first connection pattern CIP1. The first connection pattern CIP1 has a serpentine structure and may include first portions CIP1a extending in the first direction D1 and a second portion CIP1b contacting the first connection electrode CEP1. The first portions CIP1a and the second portion CIP1b may be integrally connected to each other. The first connection pattern CIP1 may connect the first connection electrode CEP1 and the first electrode pattern EP1 of the first sensor pattern SR1 adjacent thereto to each other. The first electrode pattern EP1 adjacent to the first connection electrode CEP1 may not have a rhombus shape.

The second electrode patterns EP2 of the second sensor pattern SR2 may be connected to each other through the second wiring patterns IP2. The second wiring patterns IP2 may connect the second electrode patterns EP2 adjacent to each other. The second wiring patterns IP2 may have a serpentine structure. The second wiring patterns IP2 may have substantially the same shape and structure as the first wiring patterns IP1. The second connection electrode CEP2 and the second sensor pattern SR2 may be connected to each other through the second connection patterns CIP2. The second connection patterns CIP2 have a serpentine structure and may extend in the second direction D2. The second connection patterns CIP2 may connect the second connection electrode CEP2 and the second electrode pattern EP2 of the second sensor pattern SR2 adjacent thereto to each other. The second electrode pattern EP2 adjacent to the second connection electrode CEP2 may not have a rhombus shape.

The first wiring patterns IP1 and the second wiring patterns IP2 may have substantially the same or similar shapes to each other. The first portions CIP1a of the first connection pattern CIP1 and the second connection patterns CIP2 may have substantially the same or similar shapes to each other.

Each of the first connection electrode CEP1, the second connection electrode CEP2, the first connection pattern CIP1, the second connection pattern CIP2, the first electrode pattern EP1, the first wiring pattern IP1, the second electrode pattern EP2, and the second wiring pattern IP2 may include the same transparent conductive oxide. For example, each of the first connection electrode CEP1, the second connection electrode CEP2, the first connection pattern CIP1, the second connection pattern CIP2, the first electrode pattern EP1, the first wiring pattern IP1, the second electrode pattern EP2, and the second wiring pattern IP2 may include ITO. As another example, each of the first connection electrode CEP1, the second connection electrode CEP2, the first connection pattern CIP1, the second connection pattern CIP2, the first electrode pattern EP1, the first wiring pattern IP1, the second electrode pattern EP2, and the second wiring pattern IP2 may include the same opaque metallic material (e.g., molybdenum).

The first connection patterns CIP1, the first electrode patterns EP1, and the first wiring patterns IP1 may be integrally connected to each other. In other words, an interface may not be visible between the first connection patterns CIP1, the first electrode patterns EP1, and the first wiring patterns IP1. As will be described later, by etching the preliminary electrode layer, the first connection patterns CIP1, the first electrode patterns EP1, and the first wiring patterns IP1 may be simultaneously formed.

The first connection electrode CEP1 and the first connection patterns CIP1 may not be integrally formed with each other. In other words, an interface may be visible between the first connection electrode CEP1 and the first connection patterns CIP1. As will be described later, this is because the first connection electrode CEP1 and the first connection patterns CIP1 are formed through different processes.

For example, a width of each of the first wiring patterns IP1 may be smaller than a width of each of the first portions CIP1a of the first connection pattern CIP1. As another example, a width of each of the first wiring patterns IP1 may be equal to or greater than a width of each of the first portions CIP1a of the first connection patterns CIP1.

The second connection electrode CEP2, the second connection patterns CIP2, the second electrode patterns EP2, and the second wiring patterns IP2 may be integrally connected to each other. In other words, an interface may not be visible between the second connection electrode CEP2, the second connection patterns CIP2, the second electrode patterns EP2, and the second wiring patterns IP2. As will be described later, by etching the preliminary electrode layer, the second connection electrode CEP2, the second connection patterns CIP2, the second electrode patterns EP2, and the second wiring patterns IP2 may be simultaneously formed.

For example, a width of each of the second wiring patterns IP2 may be smaller than a width of each of the second connection patterns CIP2. As another example, a width of each of the second wiring patterns IP2 may be equal to or greater than a width of each of the second connection patterns CIP2.

An insulating layer ISL may be provided between the first connection electrode CEP1 and the second connection electrode CEP2. The insulating layer ISL may include, for example, at least one of silicon oxide and silicon nitride. The insulating layer ISL may electrically separate the first sensor part SP1 and the second sensor part SP2 that cross each other. The insulating layer ISL may cover a portion of the first connection electrode CEP1. Specifically, the insulating layer ISL may cover a portion of each of the sidewall and the upper surface of the first connection electrode CEP1. A portion of the first connection electrode CEP1 may be exposed by the insulating layer ISL. The first connection pattern CIP1 may be connected to a portion of the exposed first connection electrode CEP1. Specifically, the second portion CIP1b of the first connection pattern CIP1 may contact the first connection electrode CEP1 exposed by the insulating layer ISL. The second portion CIP1b of the first connection pattern CIP1 may cover the exposed upper surface and sidewalls of the first connection electrode CEP1. The second portion CIP1b of the first connection pattern CIP1 may extend onto the upper surface of the insulating layer ISL. The second portion CIP1b of the first connection pattern CIP1 may cover a portion of each of the upper surface and the sidewall of the insulating layer ISL.

A second connection electrode CEP2 may be provided on the insulating layer ISL. The second connection electrode CEP2 may cover a portion of the insulating layer ISL. Specifically, the second connection electrode CEP2 may cover a portion of each of the sidewall and the top surface of the insulating layer ISL. A portion of the insulating layer ISL may be exposed by the second connection electrode CEP2. The second connection electrode CEP2 may be spaced apart from the second portion CIP1b of the first connection pattern CIP1.

A protective layer PRL surrounding the first sensor part SP1 and the second sensor part SP2 may be provided. The protective layer PRL may surround the upper surface, lower surface, and sidewalls of each of the first sensor part SP1 and the second sensor part SP2. It is possible to prevent the first sensor part SP1 and the second sensor part SP2 from being damaged or deformed from external impact by the protective layer PRL. The protective layer PRL may include, for example, a transparent insulating material such as polyimide. The substrate SUB may surround sidewalls and a lower surface of the protective layer PRL. The upper surface of the protective layer PRL may be exposed by the substrate SUB. As another example, the upper surface of the protective layer PRL may be covered by the substrate SUB.

The first sensor part SP1 and the second sensor part SP2 may have a vertically symmetrical structure and a horizontally symmetrical structure, respectively. In other words, the first sensor part SP1 and the second sensor part SP2 may have a symmetric structure in each of the first direction D1, the second direction D2, and the third direction D3.

The level of each upper surface of first electrode patterns EP1, first wiring patterns IP1, first portions CIP1a of first connection pattern CIP1, the second electrode patterns EP2, second wiring patterns IP2, and second connection patterns CIP2 may be a first level LV1. That is, the level of each upper surface of first electrode patterns EP1, first wiring patterns IP1, first portions CIP1a of first connection pattern CIP1, the second electrode patterns EP2, second wiring patterns IP2, and second connection patterns CIP2 may be located at substantially the same level as each other. For example, the level of the upper surface of the first connection electrode CEP1 may be the first level LV1. As another example, the level of the upper surface of the first connection electrode CEP1 may be different from the first level LV1.

The level of the uppermost surface of the second connection electrode CEP2 may be the second level LV2. The second level LV2 may be located at a level higher than the first level LV1. That is, the uppermost surface of the second connection electrode CEP2 may be located at a level higher than each of the upper surfaces of the first electrode patterns EP1, the first wiring patterns IP1, the first portions CIP1a of the first connection pattern CIP1, the second electrode patterns EP2, the second wiring patterns IP2, the second connection patterns CIP2, and the first connection electrode CEP1. For example, the level of the uppermost surface of the second portion CIP1b of the first connection pattern CIP1 may be located at the second level LV2. As another example, the level of the uppermost surface of the second portion CIP1b of the first connection pattern CIP1 may be different from the level of the second level LV2.

The lowermost surface of each of the first electrode patterns EP1, the first wiring patterns IP1, the first connection patterns CIP1, the second electrode patterns EP2, the second wiring patterns IP2, and the second connection patterns field CIP2 and the lowermost surface of the second connection electrode CEP2 may be located at the same level.

Since the transparent conductive oxide is mostly composed of a brittle material, when wiring patterns have a straight structure, their flexibility may be deteriorated. According to embodiments of the inventive concept, the first wiring patterns IP1, the second wiring patterns IP2, the first connection patterns CIP1, and the second connection patterns CIP2 including the transparent conductive oxide may have a serpentine structure. That is, as wiring patterns connecting adjacent electrode patterns have a serpentine structure, their flexibility may be improved. As a result, the touch recognition capability of the flexible touch panel may be improved. In addition, since the first sensor part SP1 and the second sensor part SP2 have a structure symmetric to each other left and right and up and down, respectively, when the flexible touch panel 10 is bent, mechanical reliability may be improved. As will be described later, the first sensor part SP1 and the second sensor part SP2 excluding the first connection electrode CEP1 may be simultaneously formed using a photolithography process by etching the preliminary electrode layer. Accordingly, it is possible to implement fine patterns compared to the printing process. As a result, a touch panel having a high resolution may be provided.

FIGS. 7, 9, 11 and 13 are for explaining a method of manufacturing a flexible touch panel according to embodiments of the inventive concept, and are respectively enlarged plan views of area N of FIG. 2. FIGS. 8, 10, 12A, and 14A are cross-sectional views taken along line A-A' of FIGS. 7, 9, 11, and 13, respectively. FIGS. 12B and 14B are cross-sectional views taken along line B-B' of FIGS. 11 and 13, respectively.

Figure 7:
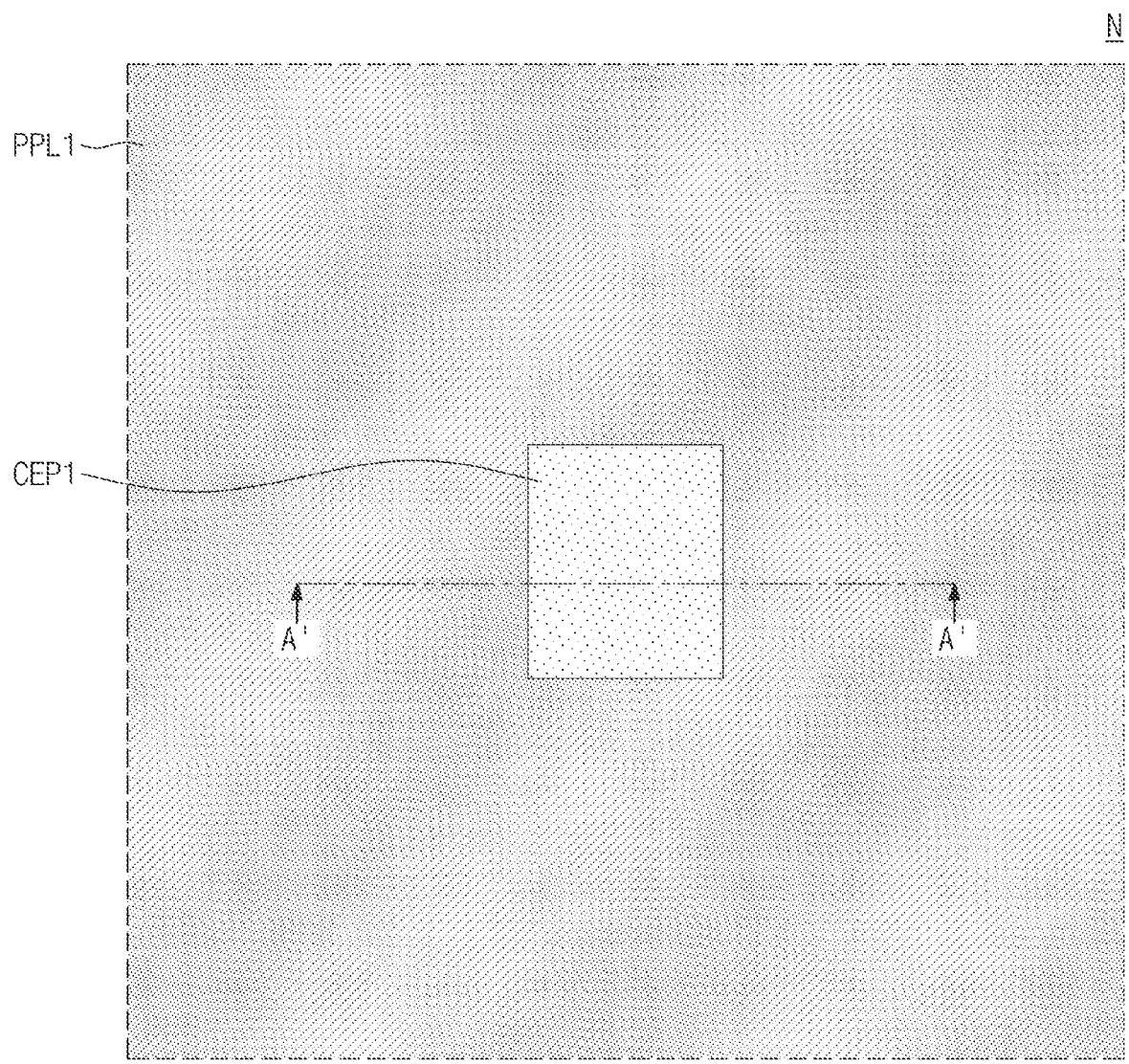
FIGS. 7, 9, 11 and 13 are for explaining a method of manufacturing a flexible touch panel according to embodiments of the inventive concept, and are respectively enlarged plan views of area N of FIG. 2.
Figure 8:
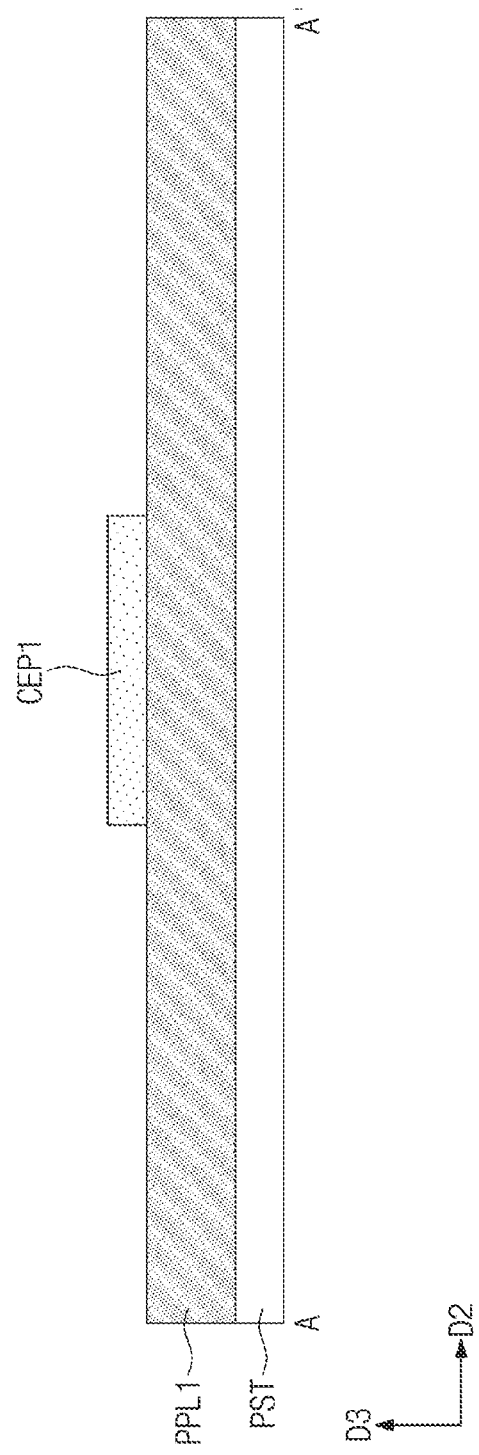
FIGS. 8, 10, 12A, and 14A are cross-sectional views taken along line A-A' of FIGS. 7, 9, 11, and 13, respectively.

Referring to FIGS. 7 and 8, a carrier substrate PST may be provided. The carrier substrate PST may include, for example, glass. A first preliminary protective layer PPL1 may be formed on an entire surface of the carrier substrate PST. The first preliminary protective layer PPL1 may include, for example, polyimide. A preliminary connection electrode film (not shown) may be formed on the entire surface of the first preliminary protective layer PPL1. For example, the preliminary connection electrode film may include a transparent conductive oxide such as ITO. After a first mask pattern (not shown) is formed on the preliminary connection electrode film, the first connection electrode CEP1 may be formed using this as an etching mask. The first connection electrode CEP1 may be formed using a photolithography process.

Figure 9:
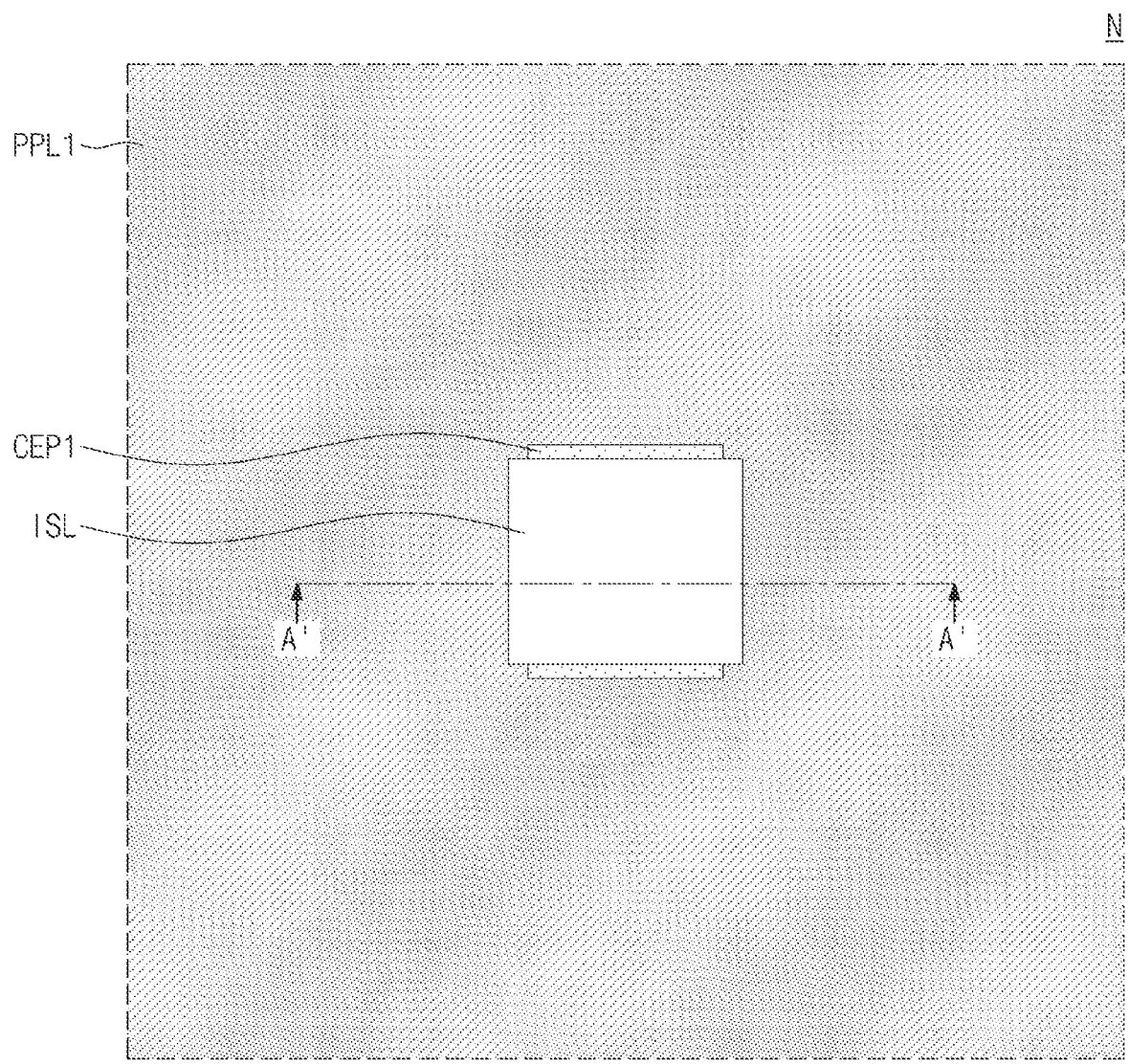
Figure 10:
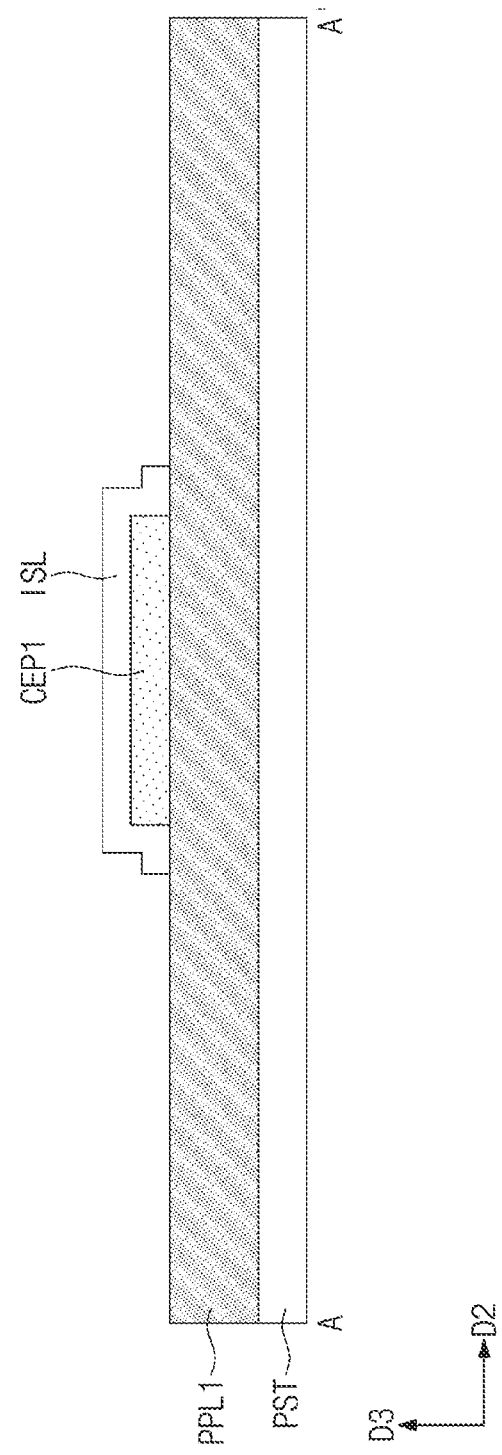

Referring to FIGS. 9 and 10, an insulating layer ISL may be formed on the first connection electrode CEP1. The insulating layer ISL may include, for example, at least one of silicon oxide and silicon nitride. The insulating layer ISL may cover a portion of the first connection electrode CEP1. A portion of the first connection electrode CEP1 may be exposed by the insulating layer ISL. The insulating layer ISL may also be formed using a photolithography process like the first connection electrode CEP1.

Figure 11:
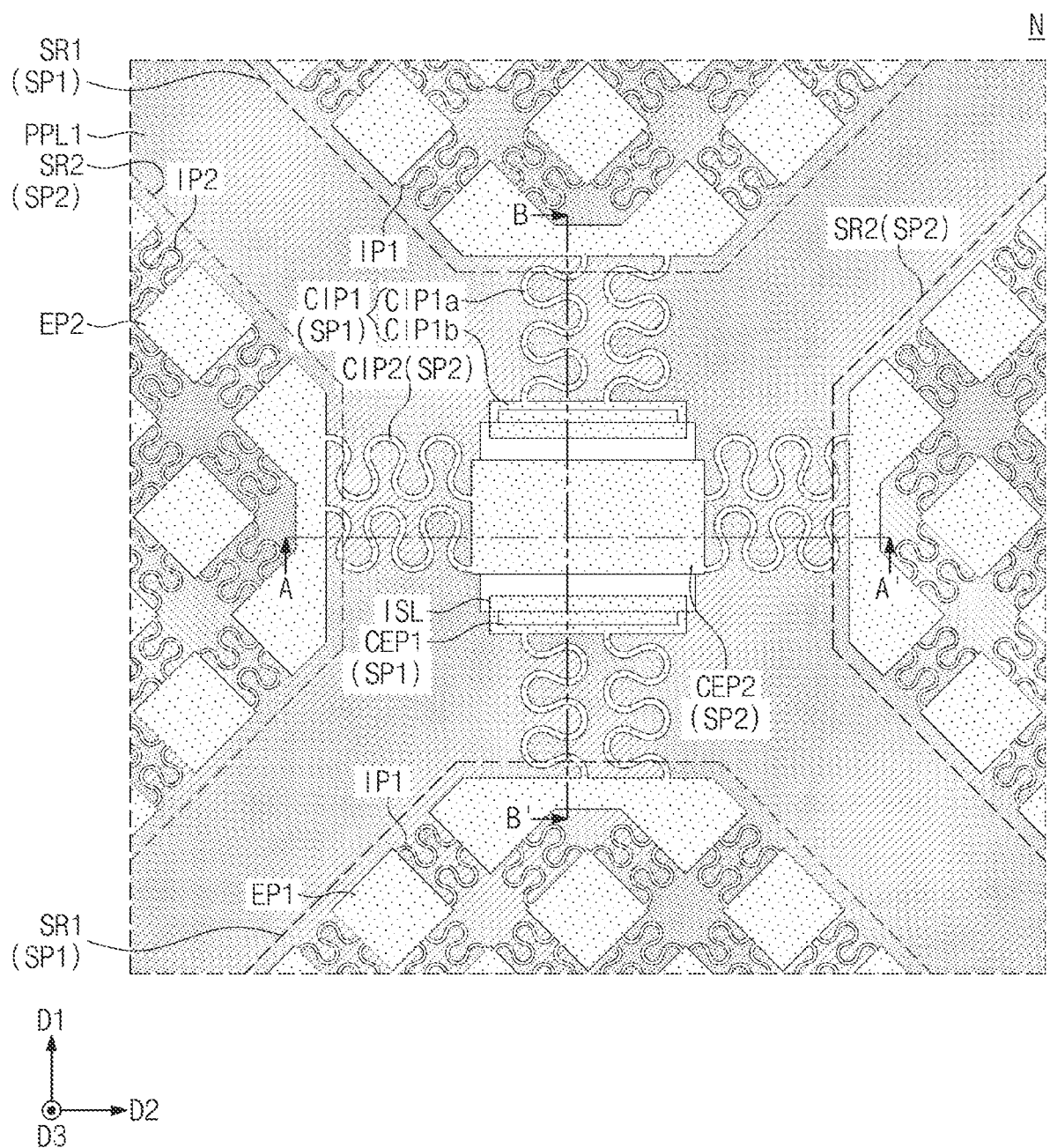
Figure 12A:
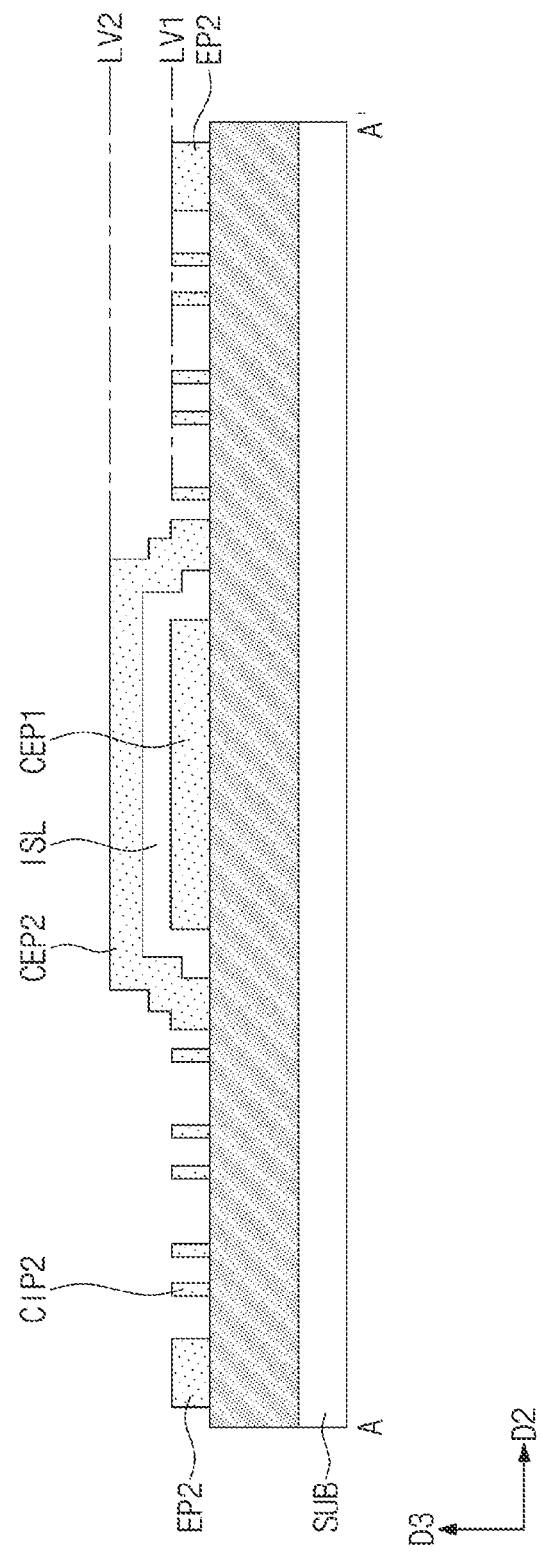
Figure 12B:
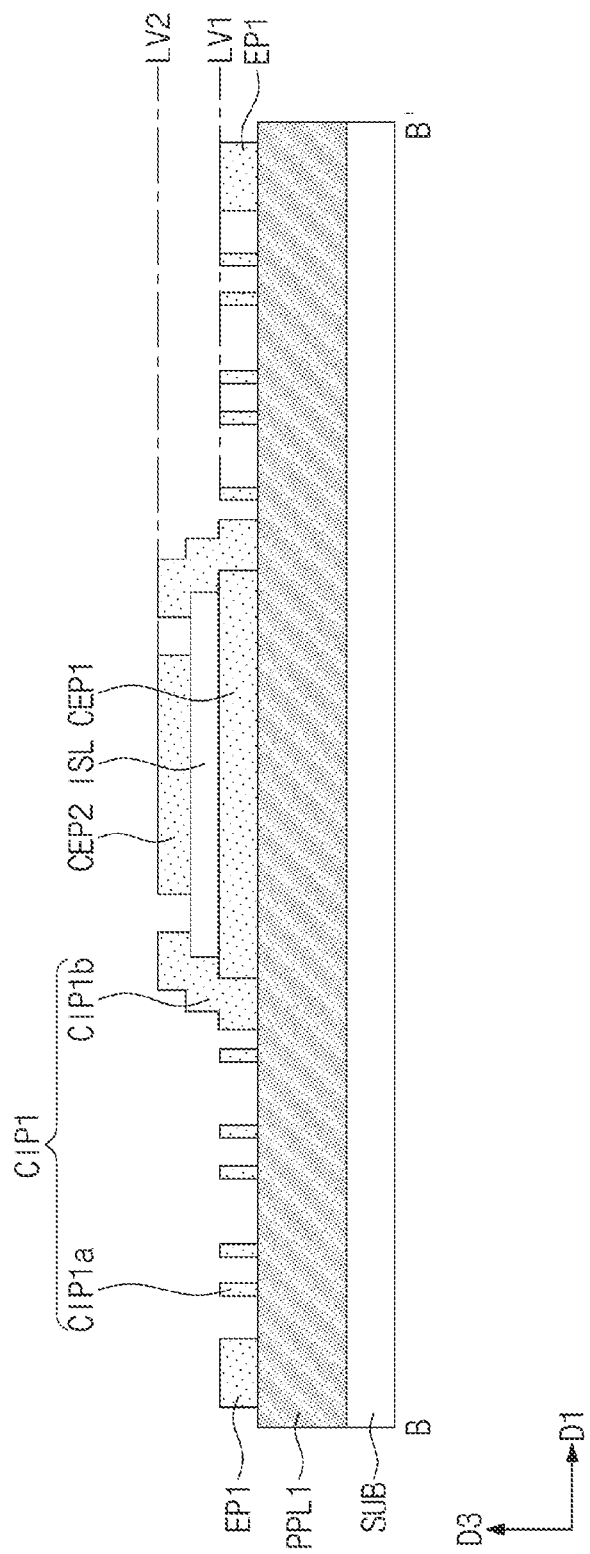
FIGS. 12B and 14B are cross-sectional views taken along line B-B' of FIGS. 11 and 13, respectively.

Referring to FIGS. 11, 12A, and 12B, a preliminary electrode film (not shown) may be formed on the entire surface of the first preliminary protective layer PPL1. The preliminary electrode film may include, for example, a transparent conductive oxide such as ITO. The preliminary electrode film may cover the first connection electrode CEP1 and the insulating layer ISL. After forming a second mask pattern (not shown) on the preliminary electrode film, a first sensor part SP1 and a second sensor part SP2 may be formed using this as an etching mask. In other words, the first connection patterns CIP1 connected to the first connection electrode CEP1, the first electrode patterns EP1 and first wiring patterns IP1 of the first sensor pattern SR1, the second electrode patterns EP2 and the second wiring patterns IP2 of the second sensor pattern SR2, the second connection electrode CEP2 on the insulating layer ISL, and the second connection patterns CIP2 connected to the second connection electrode CEP2 may be formed by etching the preliminary electrode film. The preliminary electrode film may be etched using a photolithography process. That is, the first sensor part SP1 and the second sensor part SP2 excluding the first connection electrode CEP1 may be simultaneously formed.

Although not shown in the drawing, the external connection electrode CNP described with reference to FIG. 1 may also be formed in the process of etching the preliminary electrode film.

According to embodiments of the inventive concept, the first sensor part SP1 and the second sensor part SP2 may be simultaneously formed using a photolithography process. That is, it may be easier to implement fine patterns compared to forming the patterns using a printing process. As a result, the manufacturing process is simplified and a touch panel having a higher resolution may be provided.

The level of each upper surface of first electrode patterns EP1, first wiring patterns IP1, first portions CIP1a of first connection pattern CIP1, the second electrode patterns EP2, second wiring patterns IP2, and second connection patterns CIP2 may be a first level LV1. The level of the uppermost surface of the second connection electrode CEP2 may be the second level LV2. The second level LV2 may be located at a level higher than the first level LV1. For example, the uppermost surface of the second portion CIP1b of the first connection pattern CIP1 may be located at the second level LV2.

The lowermost surface of each of the first electrode patterns EP1, the first wiring patterns IP1, the first connection patterns CIP1, the second electrode patterns EP2, the second wiring patterns IP2, and the second connection patterns field CIP2 and the lowermost surface of the second connection electrode CEP2 may be located at the same level.

The first connection patterns CIP1, the first electrode patterns EP1, and the first wiring patterns IP1 may be integrally connected to each other. In other words, an interface may not be visible between the first connection patterns CIP1, the first electrode patterns EP1, and the first wiring patterns IP1.

The first connection electrode CEP1 and the first connection patterns CIP1 may not be integrally formed with each other. In other words, an interface may be visible between the first connection electrode CEP1 and the first connection patterns CIP1.

The second connection electrode CEP2, the second connection patterns CIP2, the second electrode patterns EP2, and the second wiring patterns IP2 may be integrally connected to each other. In other words, an interface may not be visible between the second connection electrode CEP2, the second connection patterns CIP2, the second electrode patterns EP2, and the second wiring patterns IP2.

Figure 13:
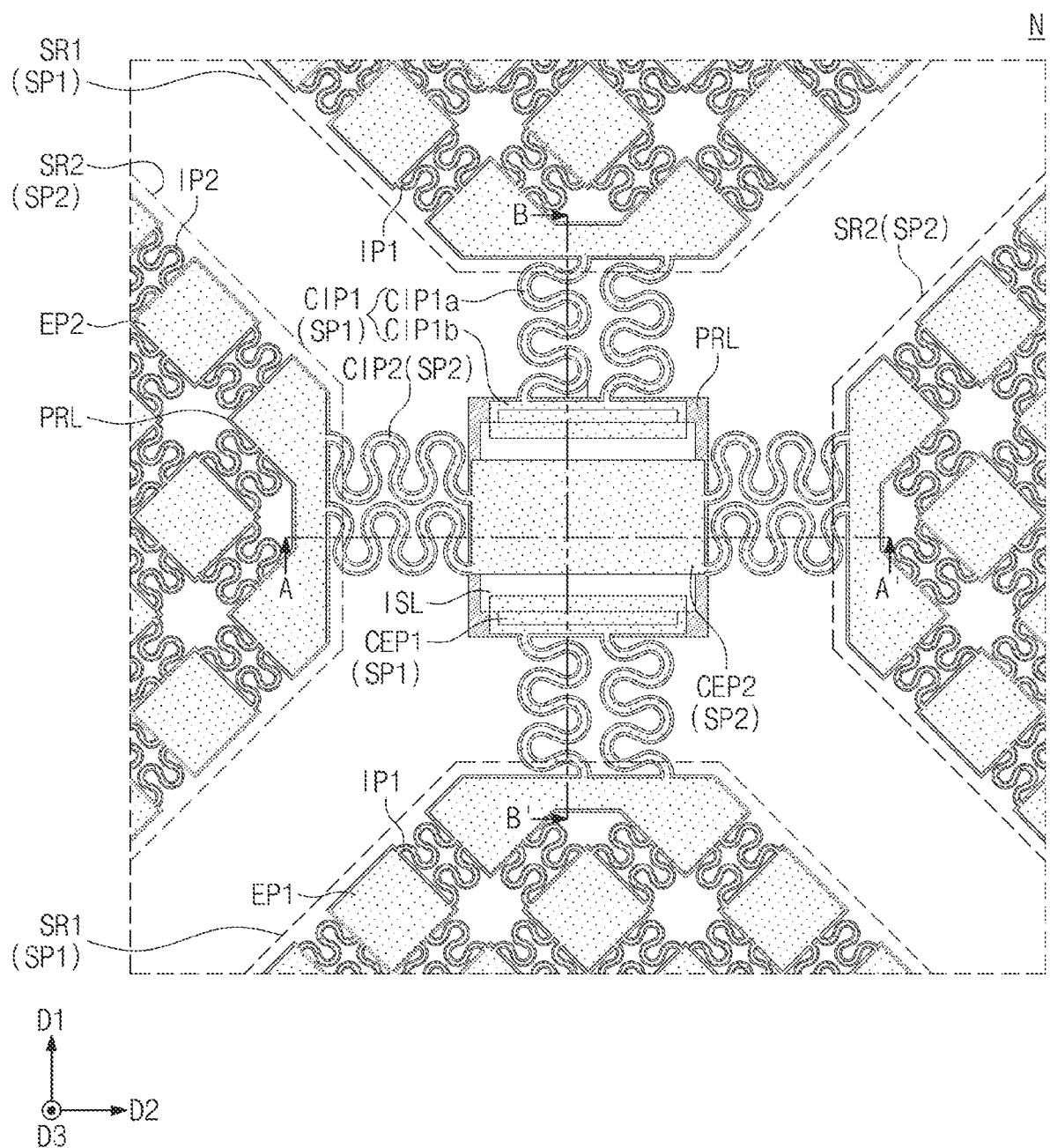
Figure 14A:
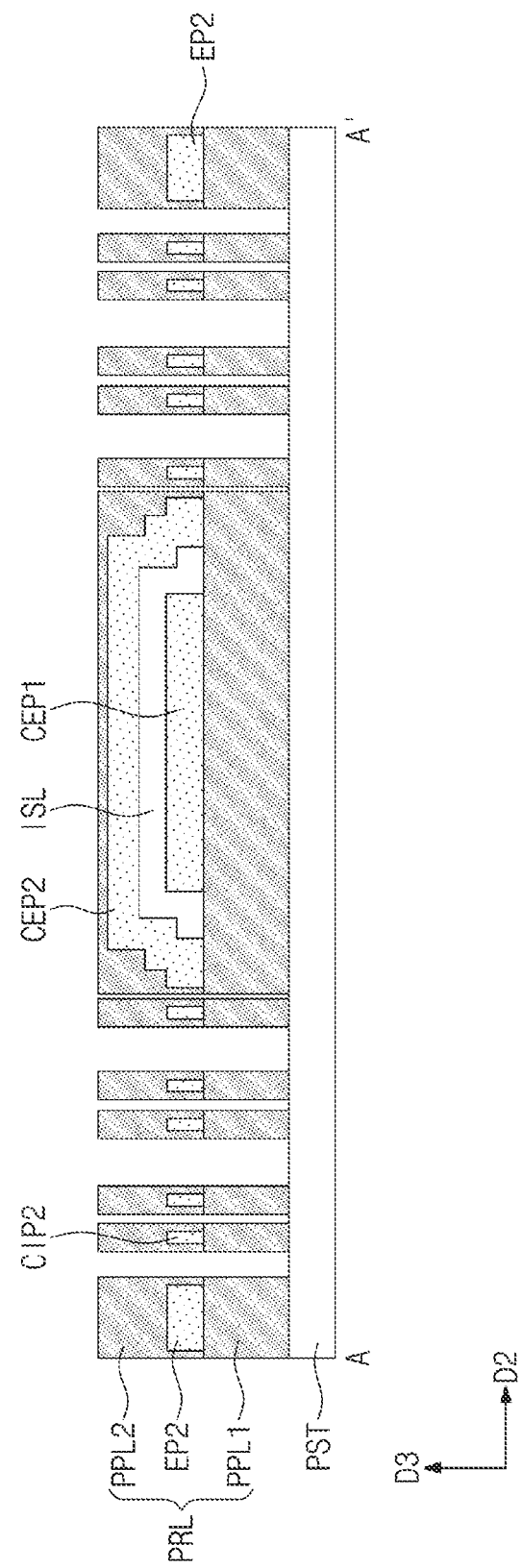
Figure 14B:
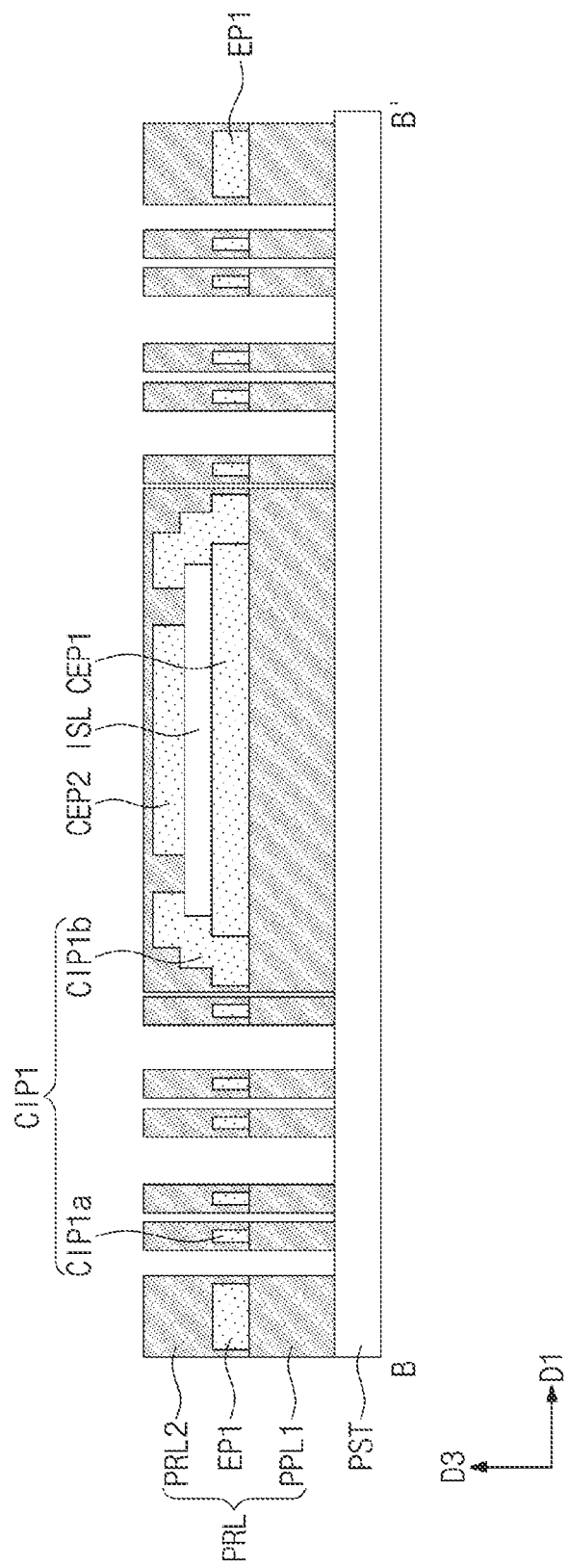

Referring to FIGS. 13, 14A, and 14B, a second preliminary protective layer PPL2 may be formed on the entire surface of the first preliminary protective layer PPL1. The second preliminary protective layer PPL2 may include the same material as the first preliminary protective layer PPL1. For example, the second preliminary protective layer PPL2 may include polyimide. The second preliminary protective layer PPL2 may cover the first sensor part SP1 and the second sensor part SP2.

A third mask pattern (not shown) may be formed on the second preliminary protective layer PPL2. The second preliminary protective layer PPL2 and the first preliminary protective layer PPL1 may be etched using the third mask pattern as an etching mask. As a result, the protective layer PRL may be formed. The protective layer PRL may surround the upper surface, lower surface, and sidewalls of each of the first sensor part SP1 and the second sensor part SP2. The protective layer PRL may be formed by etching the first preliminary protective layer PPL1 and the second preliminary protective layer PPL2 to correspond to the shapes of the first sensor part SP1 and the second sensor part SP2. A portion of the carrier substrate PST may be exposed by the protective layer PRL.

Figure 16:
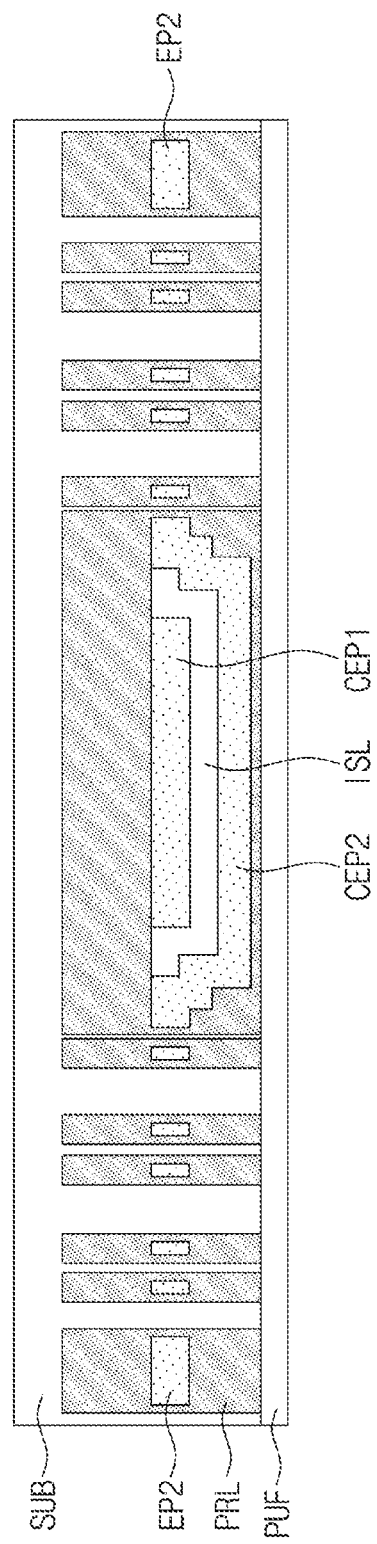

FIGS. 15 and 16 are cross-sectional views for explaining a method of manufacturing a flexible touch panel according to embodiments of the inventive concept. Specifically, FIGS. 15 and 16 are cross-sectional views for explaining a process of transferring the first sensor part SP1 and the second sensor part SP2 onto the substrate SUB.

Referring to FIG. 15, an adhesive film PUF may be formed on the resultant product described with reference to FIGS. 13, 14A and 14B. That is, the adhesive film PUF may be formed on the protective layer PRL. Thereafter, the carrier substrate PST may be detached using a laser lift-off process.

Referring to FIG. 16, after turning over the result of FIG. 15, a substrate SUB may be formed. The substrate SUB may include a flexible material. For example, the substrate SUB may include an elastomer such as rubber. The substrate SUB may be formed using a casting process. Although not shown, a frame FR surrounding the protective layer PRL may be formed in a planar manner (see FIG. 1). For example, the substrate SUB may be formed using a casting process using the adhesive film PUF and the frame FR as casting molds. That is, the substrate SUB may be finally formed by pouring a flexible material such as liquefied elastomer on the protective layer PRL, hardening the resultant product, and removing the adhesive film PUF.

As another example, after removing the adhesive film PUF, the elastomer may be additionally coated. Accordingly, the upper surface, lower surface, and sidewalls of the protective layer PRL may be surrounded by the substrate SUB.

According to embodiments of the inventive concept, the first wiring patterns, the second wiring patterns, the first connection patterns, and the second connection patterns including the transparent conductive oxide may have a serpentine structure. That is, flexibility may be improved because wiring patterns connecting adjacent electrode patterns have a serpentine structure. As a result, the touch recognition capability of the flexible touch panel may be improved.

Although the embodiments of the inventive concept have been described, it is understood that the inventive concept should not be limited to these embodiments but various changes and modifications may be made by one ordinary skilled in the art within the spirit and scope of the inventive concept as hereinafter claimed.

What is claimed is:

1. A flexible touch panel comprising:
    a first sensor part extending in a first direction on a substrate;
    a second sensor part extending in a second direction crossing the first direction on the substrate; and
    a protective layer surrounding the first and second sensor parts,
    wherein the first sensor part comprises:
        first sensor patterns spaced apart from each other in the first direction;
        a first connection electrode disposed between the first sensor patterns adjacent to each other; and
        first connection patterns connecting the first connection electrode and the first sensor patterns to each other,
    wherein each of the first sensor patterns comprises first electrode patterns spaced apart from each other in a form of a mesh and first wiring patterns connecting the adjacent first electrode patterns to each other, wherein each of the first wiring patterns and the first connection patterns has a serpentine structure, wherein the first connection patterns are wider and more serpentine than the first wiring patterns, and wherein the first electrode patterns and the first wiring patterns comprise the same material as each other.

2. The flexible touch panel of claim 1, wherein each of the first electrode patterns and the first wiring patterns comprises indium tin oxide (ITO) and is integrally connected to each other.

3. The flexible touch panel of claim 1, wherein the protective layer comprises polyimide.

4. The flexible touch panel of claim 1, wherein each of the first connection patterns comprises:

first portions having a serpentine structure and extending in the first direction; and a second portion in contact with the first connection electrode.

5. The flexible touch panel of claim 4, wherein upper surface of each of the first electrode patterns, the first wiring patterns, and the first portions of the first connection patterns are located at substantially the same level.

6. The flexible touch panel of claim 4, wherein an uppermost surface of the second portion of the first connection patterns is located at a higher level than upper surfaces of the first portions of the first connection patterns.

7. The flexible touch panel of claim 1, wherein the second sensor part comprises:

second sensor patterns spaced apart from each other in the second direction;

a second connection electrode disposed between the second sensor patterns adjacent to each other; and second connection patterns connecting the second connection electrode and the second sensor patterns to each other, wherein each of the second sensor patterns comprises second electrode patterns spaced apart from each other in a mesh shape and second wiring patterns connecting the adjacent second electrode patterns to each other.

8. The flexible touch panel of claim 7, wherein each of the second wiring patterns and the second connection patterns has a serpentine structure, wherein the second electrode patterns and the second wiring patterns comprise the same material.

9. The flexible touch panel of claim 7, wherein each of the second electrode patterns and the second wiring patterns comprises indium tin oxide (ITO) and is integrally connected to each other.

10. The flexible touch panel of claim 7, further comprising an insulating layer interposed between the second connection electrode and the first connection electrode to separate the second connection electrode and the first connection electrode from each other.

11. The flexible touch panel of claim 7, wherein a portion of the second connection electrode vertically overlaps with the first connection electrode.

12. The flexible touch panel of claim 7, wherein an uppermost surface of the second connection electrode is located at a higher level than an upper surface of each of the second electrode patterns.

13. The flexible touch panel of claim 7, wherein an upper surface of each of the first electrode patterns and the second electrode patterns is located at substantially the same level.

14. The flexible touch panel of claim 7, wherein the second connection electrode and the second connection patterns are integrally connected to each other.

15. A method for manufacturing a flexible touch panel, the method comprising:

forming a first preliminary protective layer on a carrier substrate;

forming a first connection electrode on the first preliminary protective layer;

forming an insulating layer covering a portion of the first connection electrode;

forming a preliminary electrode film on an entire surface of the first preliminary protective layer;

etching the preliminary electrode film to form a first sensor part extending in a first direction and a second sensor part extending in a second direction crossing the first direction;

forming a second preliminary protective layer covering the first and second sensor parts;

forming a protective layer by etching the first preliminary protective layer and the second preliminary protective layer in shapes corresponding to the first sensor part and the second sensor part; and transferring the first sensor part and the second sensor part to a substrate, wherein the first sensor part comprises:

first sensor patterns spaced apart from each other in the first direction; and first connection patterns connecting the first connection electrode and the first sensor patterns to each other, wherein each of the first sensor patterns comprises first electrode patterns spaced apart from each other in a form of a mesh and first wiring patterns connecting the adjacent first electrode patterns to each other, wherein each of the first wiring patterns and the first connection patterns has a serpentine structure, wherein the first connection patterns are wider and more serpentine than the first wiring patterns.

16. The method of claim 15, wherein each of the first preliminary protective layer and the second preliminary protective layer comprises polyimide, wherein the preliminary electrode film comprises indium tin oxide (ITO).

17. The method of claim 15, wherein each of the first sensor patterns comprises first electrode patterns spaced apart from each other in a mesh form and first wiring patterns connecting the adjacent first electrode patterns to each other, and wherein the first wiring patterns have a serpentine structure.

18. The method of claim 17, wherein the second sensor part comprises:

second sensor patterns spaced apart from each other in the second direction;

a second connection electrode disposed between the second sensor patterns adjacent to each other; and second connection patterns connecting the second connection electrode and the second sensor patterns to each other, wherein each of the second sensor patterns comprises second electrode patterns spaced apart from each other in a mesh shape and second wiring patterns connecting the adjacent second electrode patterns to each other.

19. The method of claim 15, wherein the preliminary electrode film is etched using a photolithography process.

20. The method of claim 15, wherein the transferring of the first sensor part and the second sensor part to the substrate comprises:

after attaching an adhesive film on the protective layer, detaching the carrier substrate; and forming a substrate covering the protective layer.

21. The flexible touch panel of claim 1, wherein the flexible touch panel is configured to locate a touch based on a mutual capacitance.

\* \* \* \* \*